(12) United States Patent
Ouyang (10) Patent No.: US 12,335,609 B1
(45) Date of Patent: Jun. 17, 2025

(54) WIRELESS DEVICE FOR CONTROLLING UNDERWATER PHOTOGRAPHING OF CAMERA

(71) Applicant: SHENZHEN MINGMEI MOBILE TECHNOLOGY CO., LTD, Guangdong (CN)

(72) Inventor: Jun Ouyang, Guangdong (CN)

(73) Assignee: SHENZHEN MINGMEI MOBILE TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/956,046

(22) Filed: Nov. 22, 2024

(30) Foreign Application Priority Data

Nov. 5, 2024 (CN) .......................... 202411582648.X
Nov. 5, 2024 (CN) .......................... 202422694656.X (51) Int. Cl.
*H04N 23/66* (2023.01)
*G03B 17/08* (2021.01)
*H04N 23/51* (2023.01)
*H04N 23/55* (2023.01)

(52) U.S. Cl.
CPC ............. *H04N 23/66* (2023.01); *G03B 17/08* (2013.01); *H04N 23/51* (2023.01); *H04N 23/55* (2023.01)

(58) Field of Classification Search
CPC ........ H04N 23/66; H04N 23/51; H04N 23/55; G03B 17/08
USPC ............................................................ 348/81
See application file for complete search history.

(56) References Cited

U.S. PATENT DOCUMENTS

| 6,128,441 | A  | * | 10/2000 | Kamata | ................ | G03B 17/08 396/25 |
| 9,998,661 | B1 | * | 6/2018 | Banta | ................... | H04N 23/698 |
| 2008/0192114 | A1 | * | 8/2008 | Pearson | ................ | G03B 17/08 396/25 |
| 2012/0133758 | A1 | * | 5/2012 | Foss | ....................... | G03B 17/08 348/81 |
| 2016/0119065 | A1 | * | 4/2016 | Tobias | .................. | G03B 17/08 348/81 |
| 2020/0218136 | A1 | * | 7/2020 | Au | ......................... | A45C 11/38 |
| 2021/0028806 | A1 | * | 1/2021 | Tsoi | ................ | H04M 1/724092 |

* cited by examiner

*Primary Examiner* — Kathleen M Walsh (57) ABSTRACT

The present disclosure discloses a wireless device for controlling underwater photographing of a camera, and belongs to the field of underwater photographic equipment. The wireless device includes a waterproof camera housing for mounting the camera; a wireless receiver for receiving a wireless control signal for controlling the camera; and a wireless transmitter for transmitting the wireless control signal for controlling the camera; wherein the wireless transmitter is wirelessly connected to the wireless receiver, and the wireless receiver is connected to the camera. During photographing, when the wireless receiver receives an optical signal transmitted by the wireless transmitter, the wireless receiver decodes the optical signal and transfers the optical signal to a control system of the camera to trigger a photographing action of the camera, so as to achieve remote control of a shutter of the camera and facilitate photographing creation at an underwater special camera location.

8 Claims, 6 Drawing Sheets

WIRELESS DEVICE FOR CONTROLLING UNDERWATER PHOTOGRAPHING OF CAMERA

CROSS REFERENCE TO RELATED APPLICATIONS

The present application claims the benefit of Chinese Patent Application Nos. 202422694656.X and 202411582648.4 filed on Nov. 5, 2024. All the above are hereby incorporated by reference in their entirety.

TECHNICAL FIELD

The present disclosure belongs to the field of underwater photographic equipment, and more particularly relates to a wireless device for controlling underwater photographing of a camera.

BACKGROUND ART

For existing underwater photographic equipment, since a camera is mounted in a waterproof camera housing, and correspondingly, a control mechanism thereof is also generally disposed on the waterproof camera housing. When operating the camera, a diver cannot leave the waterproof camera housing, thereby being relatively inconvenient to use. For example, a shutter transmission structure of the camera is mounted on the waterproof camera housing, when a diver performs underwater photographing, it is usually necessary to press the shutter transmission structure on the waterproof camera housing to trigger a shutter of the camera to take a picture, and when taking the picture, the diver cannot leave the waterproof camera housing, thereby being not conducive to photographing creation at an underwater special camera location.

SUMMARY OF THE INVENTION

In order to solve the above problems, an object of the present disclosure is to provide a wireless device for controlling underwater photographing of a camera, which can remotely control underwater photographic equipment and facilitate photographing creation at an underwater special camera location.

In order to achieve the above object, the technical solution of the present disclosure is as follows: the present disclosure provides a wireless device for controlling underwater photographing of a camera, including:
  a waterproof camera housing for mounting the camera;
  a wireless receiver for receiving a wireless control signal for controlling the camera; and
  a wireless transmitter for transmitting the wireless control signal for controlling the camera;
  wherein the wireless transmitter is wirelessly connected to the wireless receiver, and the wireless receiver is connected to the camera.

Further, a first mounting chamber is formed in the waterproof camera housing, and the camera is disposed in the first mounting chamber.

Further, a second mounting chamber is formed in the waterproof camera housing, and the wireless receiver is disposed in the second mounting chamber.

Further, the waterproof camera housing includes a waterproof front housing and a waterproof rear housing, the waterproof front housing and the waterproof rear housing are sealingly connected to form a chamber, and the first mounting chamber and the second mounting chamber are both formed in the chamber.

Further, the wireless transmitter includes a housing, a control module and a wireless transmitting module, the control module and the wireless transmitting module are both mounted to the housing, and the control module is electrically connected to the wireless transmitting module.

Further, the wireless transmitting module includes an electroluminescent element, a reflective element and a light-transmitting lens, the electroluminescent element is electrically connected to the control module, the housing includes a front housing, an end of the front housing has an opening, and the light-transmitting lens, the reflective element and the electroluminescent element are sequentially disposed in the front housing from the opening to back.

Further, a lens fixing ring is disposed at the opening, an outer wall of the lens fixing ring is detachably connected to an inner wall of the front housing, a clamping position is disposed between an inner wall of the lens fixing ring and the inner wall of the front housing, and the light-transmitting lens is disposed on the clamping position.

Further, a radiating fin is disposed on one side of the electroluminescent element away from the reflective element, and the radiating fin is attached to the inner wall of the front housing, so as to conduct heat of the electroluminescent element to the front housing for heat dissipation through the front housing.

Further, a reflector bowl is adopted as the reflective element.

Further, the housing further includes a rear housing and a clamping ring, and the front housing and the rear housing are detachably connected by the clamping ring.

Further, the wireless transmitter further includes a power supply module, and the power supply module is mounted to the rear housing and electrically connected to the control module.

Further, the power supply module includes batteries, an electrified PCB and a sealing rear cover, a battery compartment is formed in the rear housing, and a plurality of batteries are disposed in the battery compartment and electrically connected to the control module; an end of the battery compartment is provided with a connection port, and the electrified PCB is located in the connection port and electrically connected to the batteries to achieve series connection among the plurality of batteries; and the sealing rear cover is disposed on an outer side of the electrified PCB and detachably connected to an inner wall of the connection port.

Further, the sealing rear cover is provided with a first threaded element, the inner wall of the connection port is provided with a second threaded element, an outer side of the sealing rear cover is further provided with a threaded handle, one end of the first threaded element is threadedly connected to the second threaded element, and the other end thereof is fixedly connected to the threaded handle.

Further, the control module includes a main control PCB, a key PCB and a control key, the main control PCB and the key PCB are disposed in the rear housing, one end of the control key is disposed above the key PCB, and the other end thereof penetrates through and is exposed out of the rear housing; and the electroluminescent element, the batteries and key PCB are all electrically connected to the main control PCB.

Further, the wireless receiver includes a wireless receiving housing and a wireless receiving mainboard, the wireless receiving mainboard is disposed in the wireless receiving housing and can receive an infrared signal transmitted by the wireless transmitting module.

Further, the wireless receiving housing is provided with a transparent light-passing window, and the transparent light-passing window directly faces the wireless receiving mainboard, so as to be convenient for the wireless receiving mainboard to receive the infrared signal transmitted by the wireless transmitter.

Further, the wireless receiving housing includes a wireless receiving upper housing and a wireless receiving lower housing, the wireless receiving upper housing and the wireless receiving lower housing are fixedly connected to form a cavity; and the wireless receiving mainboard is disposed in the cavity and fixedly connected to the wireless receiving upper housing.

Further, the transparent light-passing window is mounted to the wireless receiving upper housing.

Compared with the prior art, the present disclosure has the following beneficial effects: by disposing the wireless transmitter and the wireless receiver, and connecting the wireless receiver to the camera through a cable release, during photographing, the optical signal is transmitted by the wireless transmitter located outside the waterproof camera housing, when the wireless receiver receives the optical signal transmitted by the wireless transmitter, the wireless receiver decodes the optical signal and transfers the optical signal to the control system of the camera, and the control system of the camera executes corresponding operation according to the decoded signal to trigger the photographing action of the camera, so as to achieve remote control of the shutter of the camera and facilitate photographing creation at the underwater special camera location.

In the drawings: 1. waterproof camera housing; 11. waterproof front housing; 12. waterproof rear housing; 2. camera; 3. wireless receiver; 31. wireless receiving housing; 311. wireless receiving upper housing; 312. wireless receiving lower housing; 32. wireless receiving mainboard; 33. transparent light-passing window; 4. wireless transmitter; 41. housing; 411. upper housing; 412. opening; 413. clamping position; 414. lower housing; 415. clamping ring; 416. battery compartment; 417. connection port; 42. control module; 421. main control PCB; 422. key PCB; 423. control key; 43. wireless transmitting module; 431. electroluminescent element; 432. reflective element; 433. light-transmitting lens; 434. lens fixing ring; 435. radiating fin; 44. power supply module; 441. battery; 442. electrified PCB; 443. sealing rear cover; 444. first threaded element; 445. second threaded element; 446. threaded handle; 5. first mounting chamber; and 6. second mounting chamber.

DETAILED DESCRIPTION OF THE INVENTION

In order to make the objects, technical solutions and advantages of the present disclosure more clear and apparent, the present disclosure will be described in further detail below in conjunction with accompanying drawings and examples. It should be understood that the specific examples described herein are illustrative of the present disclosure only and are not intended to limit the present disclosure.

Figure 1:
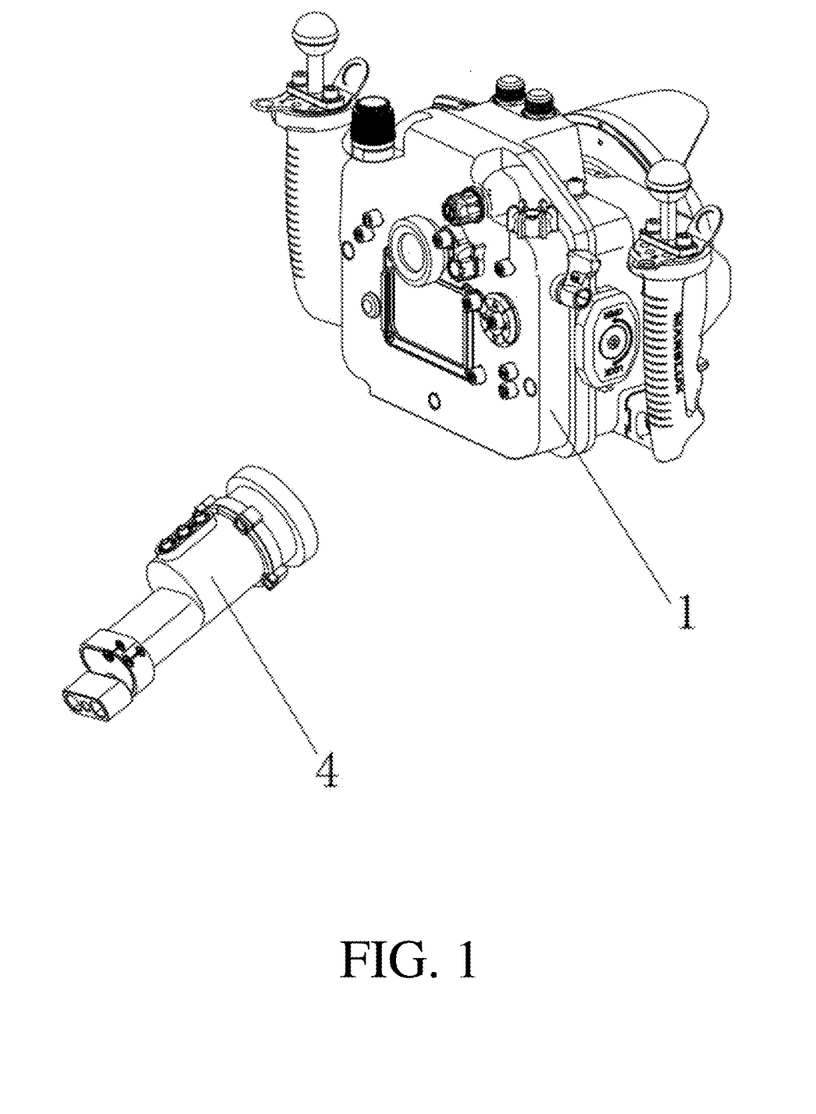
FIG. 1 is a schematic structural diagram of a wireless shutter device in which a wireless receiver is disposed in a waterproof camera housing.
Figure 2:
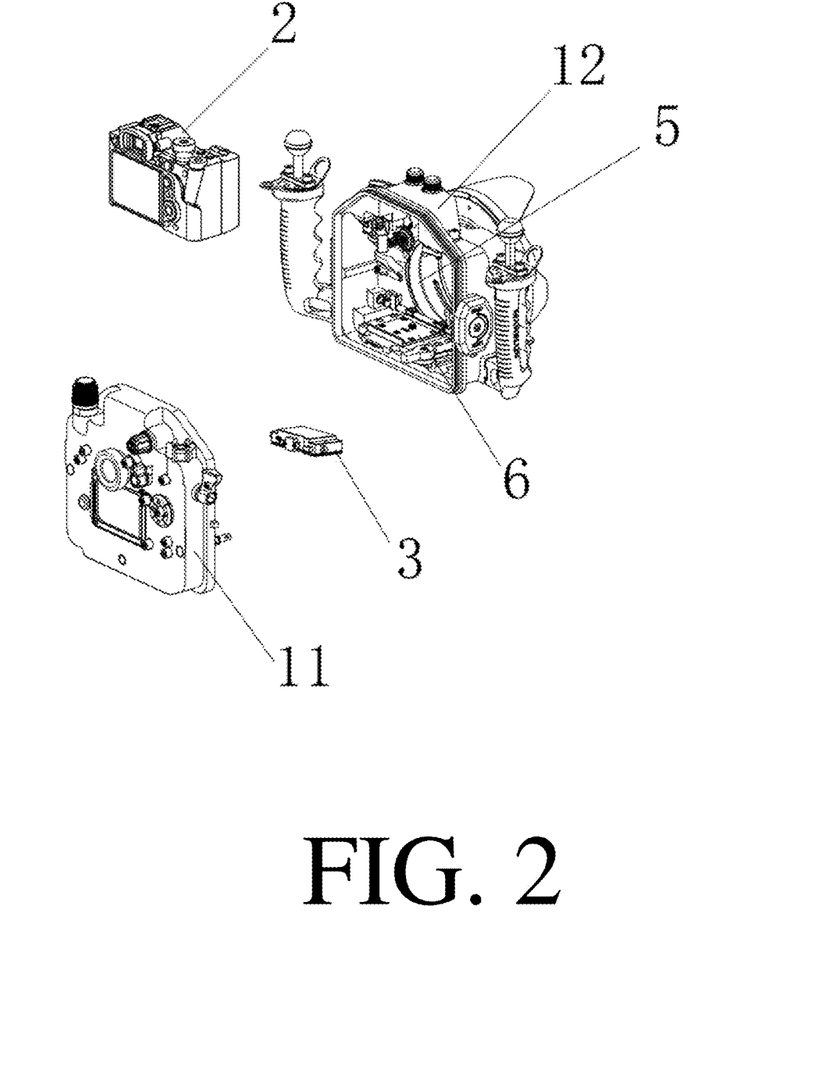
FIG. 2 is an exploded diagram of the waterproof camera housing in FIG. 1.
Figure 3:
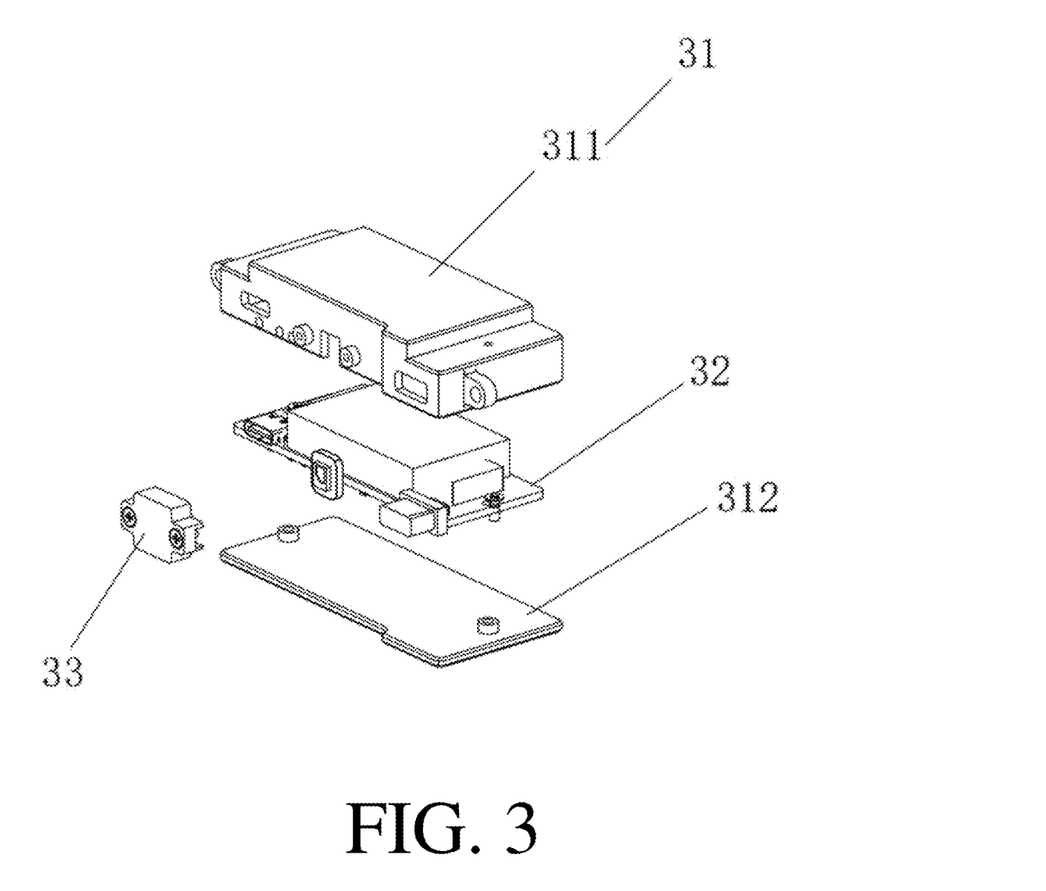
FIG. 3 is an exploded diagram of the wireless receiver.
Figure 4:
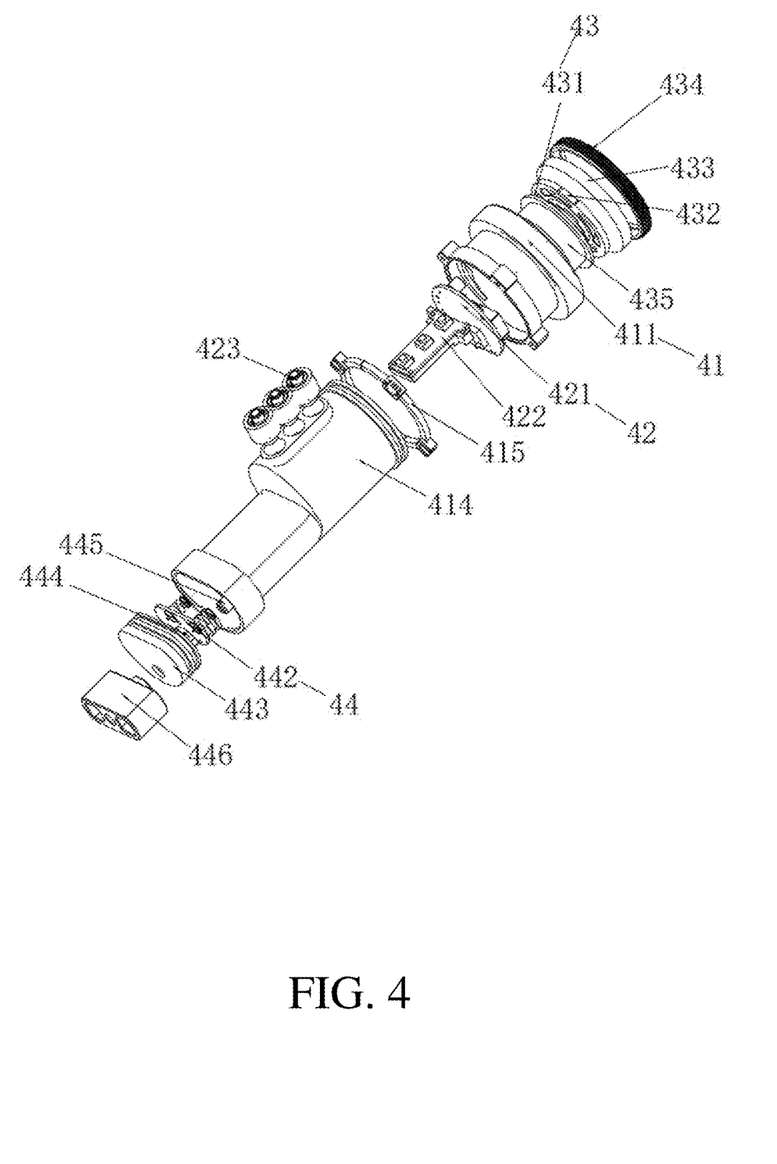
FIG. 4 is an exploded diagram of a wireless transmitter.

In order to achieve the above object, the technical solution of the present disclosure is as follows: referring to FIG. 1 to FIG. 6, this example provides a wireless device for controlling underwater photographing of a camera, including:

a waterproof camera housing 1 for mounting the camera 2;

a wireless receiver 3 for receiving a wireless control signal for controlling the camera; and a wireless transmitter 4 for transmitting the wireless control signal for controlling the camera;

wherein the wireless transmitter 4 is wirelessly connected to the wireless receiver 3, and the wireless receiver 3 is connected to the camera 2.

In this example, when this wireless device is used for controlling a shutter of the camera, a working flow thereof is as follows: the wireless receiver 3 is connected to the camera 2 through a cable release, during photographing, an optical signal is transmitted by the wireless transmitter 4 located outside the waterproof camera housing 1, when the wireless receiver 3 receives the optical signal transmitted by the wireless transmitter 4, the wireless receiver 3 decodes the optical signal and transfers the optical signal to a control system of the camera 2, and the control system of the camera 2 executes corresponding operation according to the decoded signal to trigger an photographing action of the camera 2, so as to achieve remote control of the shutter of the camera 2 and facilitate photographing creation at an underwater special camera 2 location.

In this example, referring to FIG. 1, the wireless receiver 3 may be disposed in the waterproof camera housing 1 for better protection of the wireless receiver 3. However, referring to FIG. 6, the wireless receiver 3 may be disposed outside the waterproof camera housing 1, and the cable release penetrates through a waterproof hole in the waterproof camera housing 1 to be connected to the camera 2 for convenience in taking and placement. The above two implementation modes should be within the scope of protection of the present application.

It should be understood that in this example, in addition to that the shutter of the camera may be remotely controlled in a wireless mode, the wireless control of other parameters of the camera may also be achieved by debugging the wireless transmitter, the wireless receiver and the camera, which should also be within the scope of protection of this example.

It should be noted that in this example, the wireless transmitter is wirelessly connected to the wireless receiver by adopting a blue optical signal, and when being applied to an underwater environment, the wireless transmitter has a longer transmission distance. However, conventional wireless connection modes include, but are not limited to, Bluetooth, Wi-Fi, radio frequency, infrared, sonar, and the like, which all should be within the scope of protection of this example.

Further, a first mounting chamber 5 is formed in the waterproof camera housing 1, and the camera 2 is disposed in the first mounting chamber 5.

Further, a second mounting chamber 6 is formed in the waterproof camera housing 1, and the wireless receiver 3 is disposed in the second mounting chamber 6.

Further, the waterproof camera housing 1 includes a waterproof front housing 11 and a waterproof rear housing 12, the waterproof front housing 11 and the waterproof rear housing 12 are sealingly connected to form a chamber, and the first mounting chamber 5 and the second mounting chamber 6 are both formed in the chamber.

Figure 5:
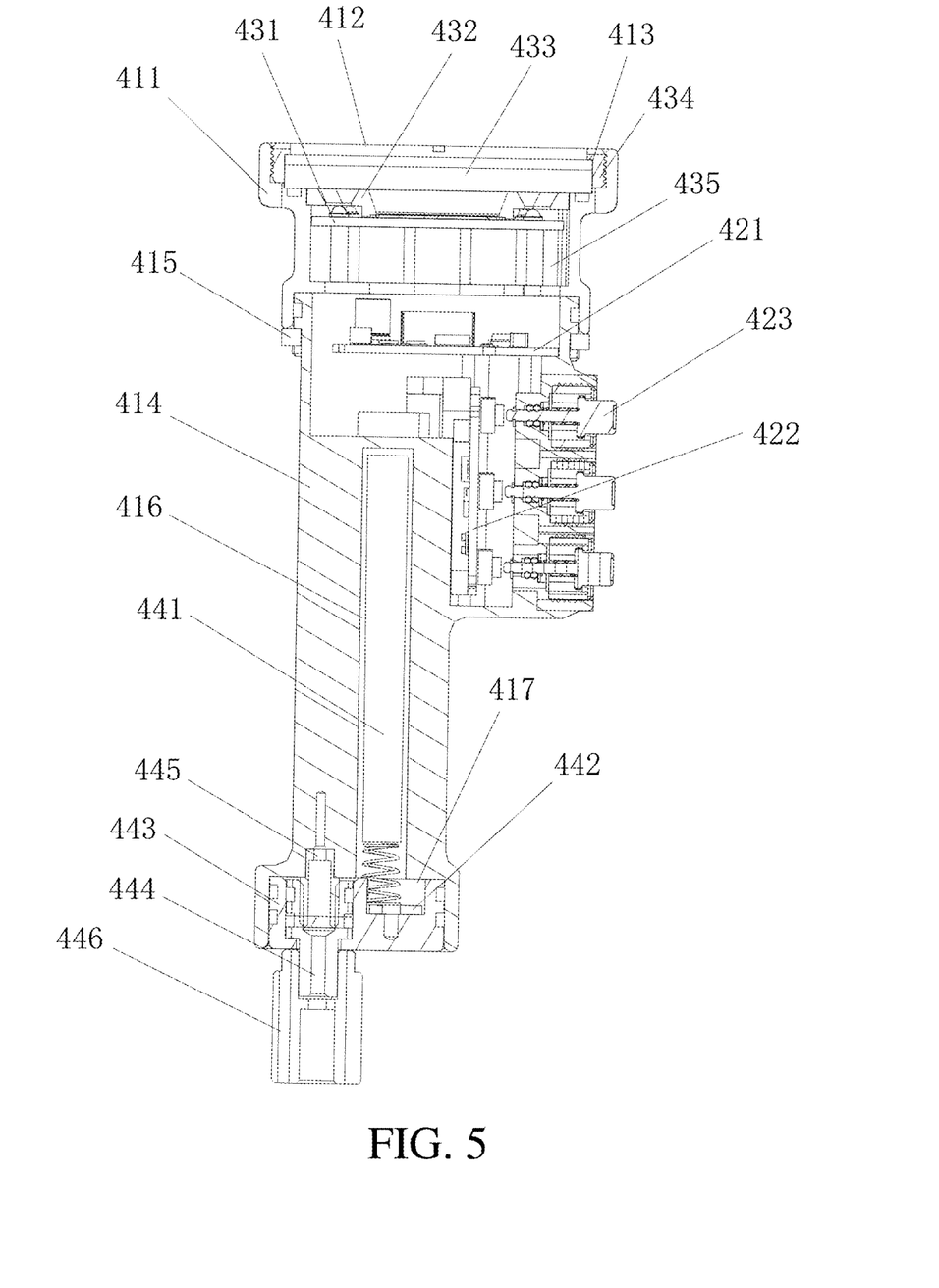
FIG. 5 is a cross-sectional diagram of the wireless transmitter.
Figure 6:
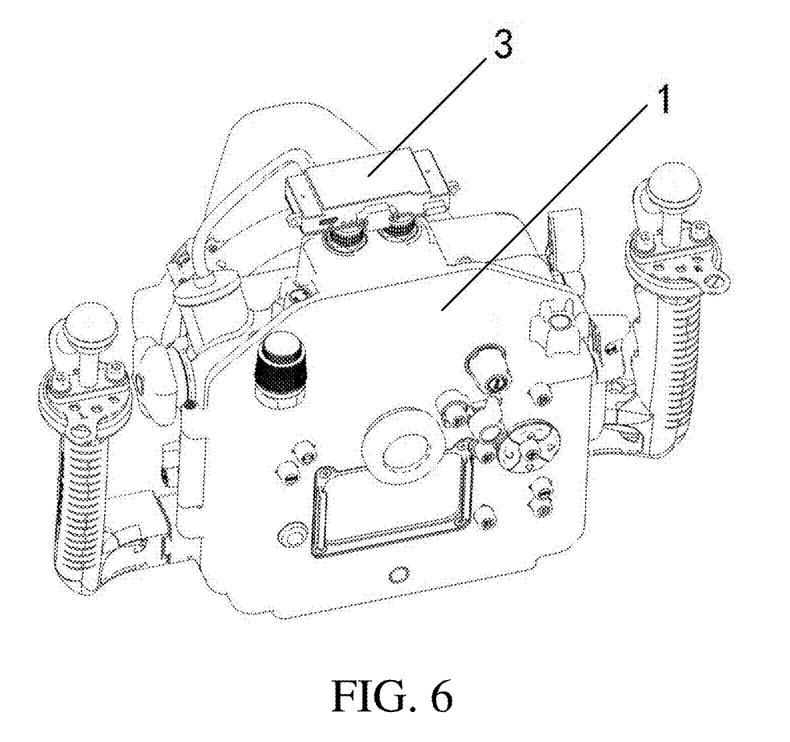
FIG. 6 is a schematic structural diagram of the waterproof camera housing in which the wireless receiver is disposed outside the waterproof camera housing.

Further, the wireless transmitter 4 includes a housing 41, a control module 42 and a wireless transmitting module 43, the control module 42 and the wireless transmitting module 43 are both mounted to the housing 41, and the control module 42 is electrically connected to the wireless transmitting module 43.

Further, the wireless transmitting module 43 includes an electroluminescent element 431, a reflective element 432 and a light-transmitting lens 433, the electroluminescent element 431 is electrically connected to the control module 42, the housing 41 includes an upper housing 411, an end of the upper housing 411 has an opening 412, and the light-transmitting lens 433, the reflective element 432 and the electroluminescent element 431 are sequentially disposed in the upper housing 411 from the opening 412 to back. In this example, after receiving a control signal of the control module 42, the electroluminescent element 431 emits blue light through a lamp bead disposed thereon, and then the blue light is transmitted by the reflective element 432 and finally passes through the light-transmitting lens 433 to be transmitted out and received by the wireless receiver 3, so as to achieve the wireless connection between the wireless transmitter 4 and the wireless receiver 3 and achieve the wireless control of the shutter of the camera.

Further, a lens fixing ring 434 is disposed at the opening 412, an outer wall of the lens fixing ring 434 is detachably connected to an inner wall of the upper housing 411, a clamping position 413 is disposed between an inner wall of the lens fixing ring 434 and the inner wall of the upper housing 411, and the light-transmitting lens 433 is disposed on the clamping position 413. Through the arrangement of the above structure, after assembling, the light-transmitting lens 433, the reflective element 432 and the electroluminescent element 431 can be sequentially pressed and held in the upper housing 411 by the lens fixing ring 434, and detachable connection is formed between the lens fixing ring 434 and the upper housing 411, so that the assembling and disassembling of the light-transmitting lens 433, the reflective element 432 and the electroluminescent element 431 can also be facilitated.

Further, a radiating fin 435 is disposed on one side of the electroluminescent element 431 away from the reflective element 432, and the radiating fin 435 is attached to the inner wall of the upper housing 411, so as to conduct heat of the electroluminescent element 431 to the upper housing 411 for heat dissipation through the upper housing 411.

Further, a lamp panel is adopted as the electroluminescent element 431, and the transmission of the optical signal is achieved by disposing a luminescent lamp bead on the lamp panel. In this example, the lamp panel is adapted to the high-power luminescence requirement, and when the luminescence power is relatively low, the lamp panel may not be disposed, and the lamp bead may be directly adopted for luminescence.

Further, a reflector bowl is adopted as the reflective element 432.

Further, the housing 41 further includes a lower housing 414 and a clamping ring 415, and the upper housing 411 and the lower housing 414 are detachably connected by the clamping ring 415.

Further, the wireless transmitter 4 further includes a power supply module 44, and the power supply module 44 is mounted to the lower housing 414 and electrically connected to the control module 42.

Further, the power supply module 44 includes batteries 441, an electrified PCB 442 and a sealing rear cover 443, a battery compartment 416 is formed in the lower housing 414, and a plurality of batteries 441 are disposed in the battery compartment 416 and electrically connected to the control module 42; an end of the battery compartment 416 is provided with a connection port 417, and the electrified PCB 442 is located in the connection port 417 and electrically connected to the batteries 441 to achieve series connection among the plurality of batteries 441; and the sealing rear cover 443 is disposed on an outer side of the electrified PCB 442 and detachably connected to an inner wall of the connection port 417. Through the above structural design, the batteries 441 and the electrified PCB 442 can be pressed, held and locked in the lower housing 414 by the sealing rear cover 443, and detachable connection is formed between the sealing rear cover 443 and the lower housing 414, so that the assembling and disassembling of the batteries 441 can also be facilitated.

Further, the sealing rear cover 443 is provided with a first threaded element 444, the inner wall of the connection port 417 is provided with a second threaded element 445, an outer side of the sealing rear cover 443 is further provided with a threaded handle 446, one end of the first threaded element 444 is threadedly connected to the second threaded element 445, and the other end thereof is fixedly connected to the threaded handle 446. Through the above structural design, the first threaded element 444 is driven by the external threaded handle 446 to move relative to the second threaded element 445, so as to achieve the assembling and disassembling between the sealing rear cover 443 and the lower housing 414.

Further, the control module 42 includes a main control PCB 421, a key PCB 422 and a control key 423, the main control PCB 421 and the key PCB 422 are disposed in the lower housing 414, one end of the control key 423 is disposed above the key PCB 422, and the other end thereof penetrates through and is exposed out of the lower housing 414; and the electroluminescent element 431, the batteries 414 and key PCB 422 are all electrically connected to the main control PCB 421. In this example, the main control PCB 421 is used for controlling the whole wireless transmitting module 43 to work, and the key PCB 422 is used for controlling the triggering of the key 423; and in use, the key PCB 422 is triggered to work by pressing the control key 423, the key PCB 422 transmits a triggering signal to the main control PCB 421, after receiving the signal, the main control PCB 421 transmits a control signal for turning on the shutter to the electroluminescent element 431, after receiving the control signal, the electroluminescent element 431 emits blue light through the lamp bead disposed thereon, and then the blue light is transmitted by the reflective element 432 and finally passes through the light-transmitting lens 433 to be transmitted out and received by the wireless receiver 3, so as to achieve the wireless connection between the wireless transmitter 4 and the wireless receiver 3 and achieve the wireless control of the shutter of the camera.

Further, the wireless receiver 3 includes a wireless receiving housing 31 and a wireless receiving mainboard 32, the wireless receiving mainboard 32 is disposed in the wireless receiving housing 31 and can receive an infrared signal transmitted by the wireless transmitting module 43.

Further, the wireless receiving housing 31 is provided with a transparent light-passing window 33, and the transparent light-passing window 33 directly faces the wireless receiving mainboard 32, so as to be convenient for the wireless receiving mainboard 32 to receive the infrared signal transmitted by the wireless transmitter 4.

Further, the wireless receiving housing 31 includes a wireless receiving upper housing 311 and a wireless receiving lower housing 312, the wireless receiving upper housing 311 and the wireless receiving lower housing 312 are fixedly connected to form a cavity; and the wireless receiving mainboard 32 is disposed in the cavity and fixedly connected to the wireless receiving upper housing 311.

Further, the transparent light-passing window 33 is mounted to the wireless receiving upper housing 311.

The foregoing is only the preferred example of the present disclosure and is not intended to limit the present disclosure. Any modification, equivalent substitution, improvement, and the like made within the spirit and principle of the present disclosure shall be included in the scope of protection of the present disclosure.

The invention claimed is:

1. A wireless device for controlling underwater photographing of a camera, comprising:
   a waterproof camera housing for mounting the camera;
   a wireless receiver for receiving a wireless control signal for controlling the camera; and
   a wireless transmitter for transmitting the wireless control signal for controlling the camera;
   wherein the wireless transmitter is wirelessly connected to the wireless receiver, and the wireless receiver is connected to the camera;
   wherein the wireless transmitter comprises a housing, a control module and a wireless transmitting module, the control module and the wireless transmitting module are both mounted to the housing, and the control module is electrically connected to the wireless transmitting module; and
   wherein the wireless transmitting module comprises an electroluminescent element, a reflective element and a light-transmitting lens, the electroluminescent element is electrically connected to the control module, the housing comprises a front housing, an end of the front housing has an opening, and the light-transmitting lens, the reflective element and the electroluminescent element are sequentially disposed in the front housing from the opening to back.

2. The wireless device for controlling underwater photographing of a camera of claim 1, wherein a first mounting chamber is formed in the waterproof camera housing, and the camera is disposed in the first mounting chamber.

3. The wireless device for controlling underwater photographing of a camera of claim 2, wherein a second mounting chamber is formed in the waterproof camera housing, and the wireless receiver is disposed in the second mounting chamber.

4. The wireless device for controlling underwater photographing of a camera of claim 3, wherein the waterproof camera housing comprises a waterproof front housing and a waterproof rear housing, the waterproof front housing and the waterproof rear housing are sealingly connected to form a chamber, and the first mounting chamber and the second mounting chamber are both formed in the chamber.

5. The wireless device for controlling underwater photographing of a camera of claim 1, wherein a lens fixing ring is disposed at the opening, an outer wall of the lens fixing ring is detachably connected to an inner wall of the front housing, a clamping position is disposed between an inner wall of the lens fixing ring and the inner wall of the front housing, and the light-transmitting lens is disposed on the clamping position.

6. The wireless device for controlling underwater photographing of a camera of claim 1, wherein the housing further comprises a rear housing and a clamping ring, and the front housing and the rear housing are detachably connected by the clamping ring.

7. The wireless device for controlling underwater photographing of a camera of claim 6, wherein the wireless transmitter further comprises a power supply module, and the power supply module is mounted to the rear housing and electrically connected to the control module.

8. The wireless device for controlling underwater photographing of a camera of claim 7, wherein the power supply module comprises batteries, an electrified PCB and a sealing rear cover, a battery compartment is formed in the rear housing, and a plurality of batteries are disposed in the battery compartment and electrically connected to the control module; an end of the battery compartment is provided with a connection port, and the electrified PCB is located in the connection port and electrically connected to the batteries to achieve series connection among the plurality of batteries; and the sealing rear cover is disposed on an outer side of the electrified PCB and detachably connected to an inner wall of the connection port.

\* \* \* \* \*

UNITED STATES PATENT AND TRADEMARK OFFICE
CERTIFICATE OF CORRECTION

| | | |
|---|---|---|
| PATENT NO. | : 12,335,609 B1 | Page 1 of 1 |
| APPLICATION NO. | : 18/956046 | |
| DATED | : June 17, 2025 | |
| INVENTOR(S) | : Jun Ouyang | |

It is certified that error appears in the above-identified patent and that said Letters Patent is hereby corrected as shown below:

On the Title Page

Item (30), the foreign application priority data should read:
Nov. 5, 2024 (CN) 202411582648.4
Nov. 5, 2024 (CN) 202422694656.X Signed and Sealed this
Twenty-sixth Day of August, 2025

Coke Morgan Stewart
*Acting Director of the United States Patent and Trademark Office*